Jan. 19, 1937.  J. B. OLSON ET AL  2,068,566
HEN BATTERY
Filed Oct. 26, 1932  4 Sheets-Sheet 1
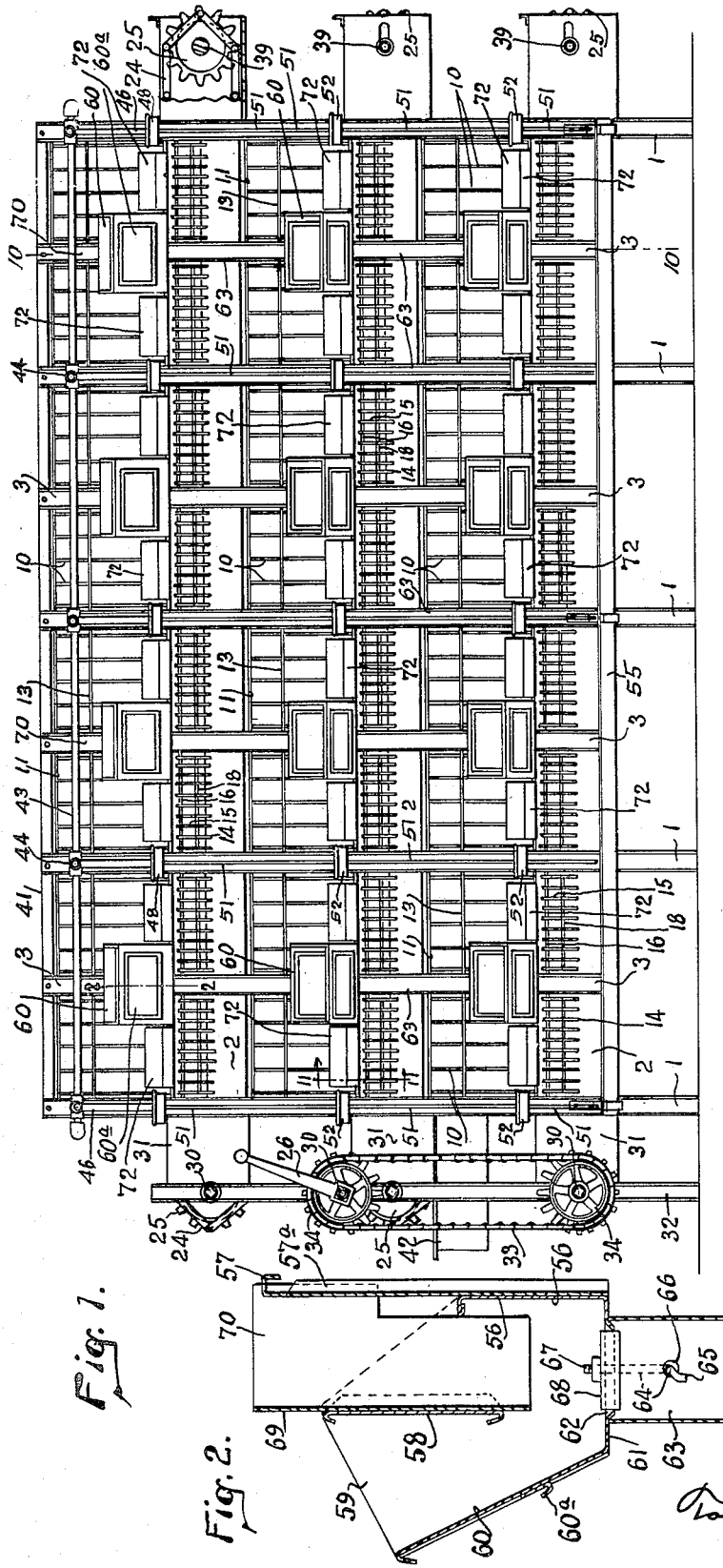
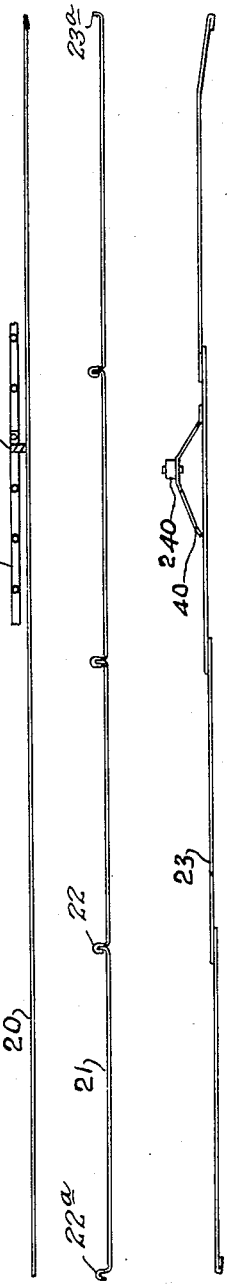
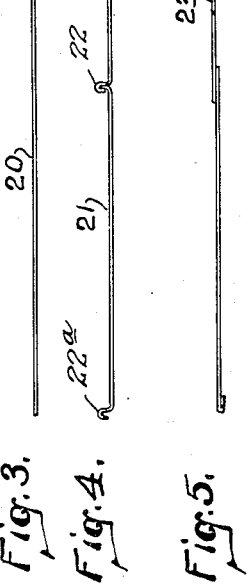
Fig. 1.  Fig. 2.  Fig. 3.  Fig. 4.  Fig. 5.
INVENTORS
JOHN B. OLSON
RUBY R. YOUNG,
BY
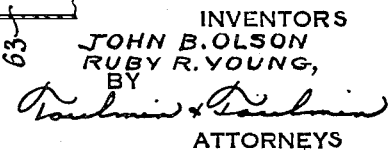
ATTORNEYS Jan. 19, 1937.  J. B. OLSON ET AL  2,068,566

HEN BATTERY

Filed Oct. 26, 1932  4 Sheets-Sheet 2

INVENTORS
JOHN B. OLSON,
RUBY R. YOUNG.
BY
*Toulmin & Toulmin*
ATTORNEYS

Jan. 19, 1937.  J. B. OLSON ET AL  2,068,566
HEN BATTERY
Filed Oct. 26, 1932  4 Sheets-Sheet 3

INVENTORS
JOHN B. OLSON,
RUBY R. YOUNG,
BY
ATTORNEYS

Jan. 19, 1937.  J. B. OLSON ET AL  2,068,566
HEN BATTERY
Filed Oct. 26, 1932  4 Sheets-Sheet 4
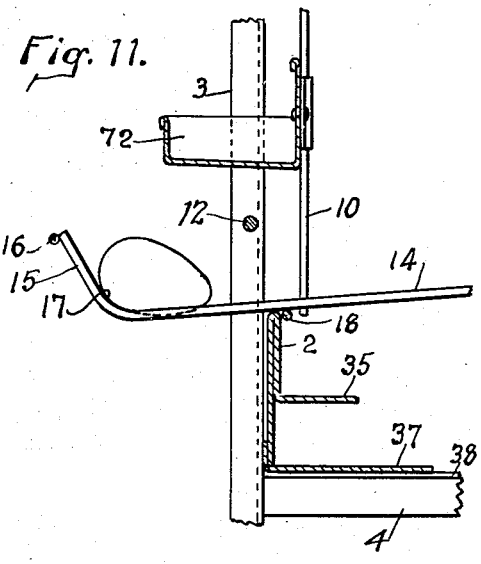
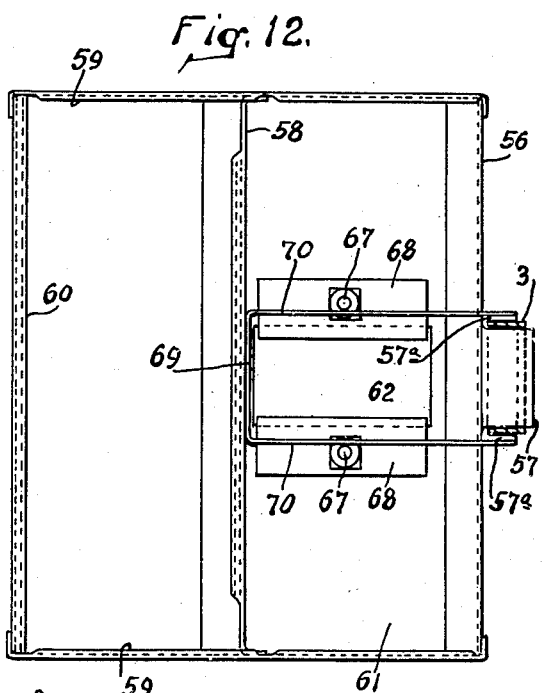
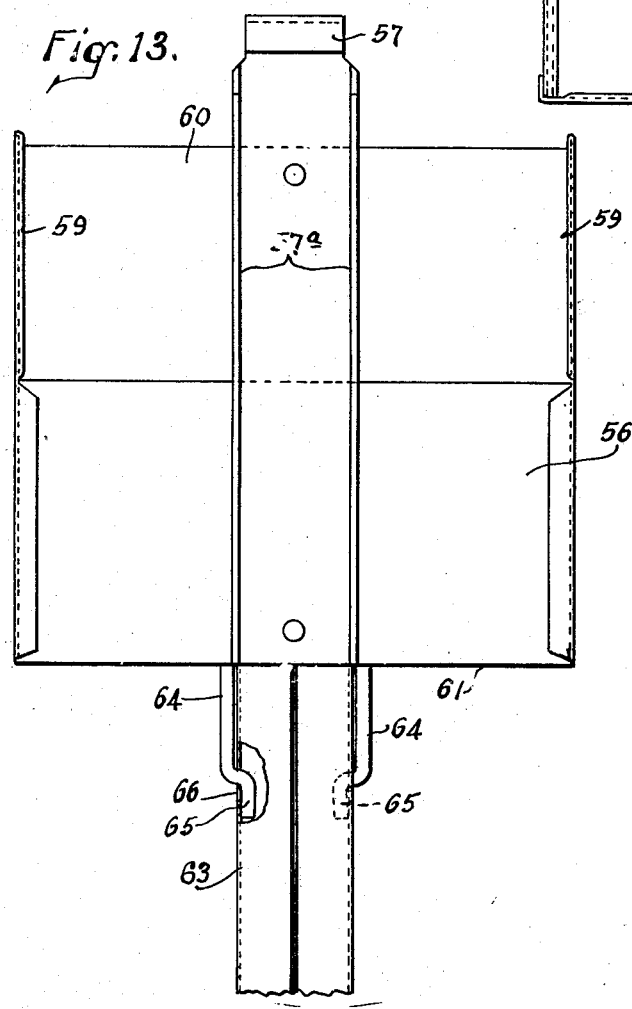
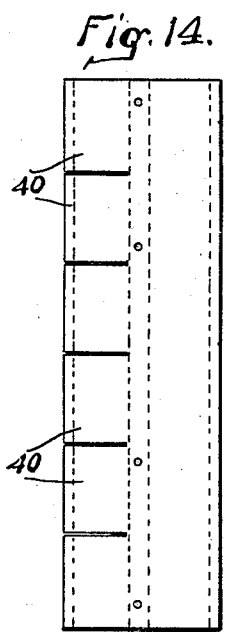
INVENTORS
JOHN B. OLSON,
RUBY R. YOUNG,
BY
ATTORNEYS Patented Jan. 19, 1937

2,068,566

UNITED STATES PATENT OFFICE 2,068,566

HEN BATTERY

John B. Olson and Ruby R. Young, Fort Atkinson, Wis., assignors to James Manufacturing Company, Fort Atkinson, Wis., a corporation of Wisconsin Application October 26, 1932, Serial No. 639,662

4 Claims. (Cl. 119—48)

Our invention relates to a combined feeding and laying cage.

It is the object of our invention to provide means of confining hens under close observation and control for the maximum efficiency in feeding for egg production.

It is our object to provide a series of cages for individual hens assembled in groups horizontally and vertically for economy of space and convenience in taking care of the hens, as well as providing a means of automatically watering and feeding the hens and cleaning the spaces in which the hens are located.

It is our object to provide an apparatus in which the cages may be erected in multiple by adding sections of cages as desired to the original grouping of cages and frame work.

It is a further object to provide an individual cage for each hen where she stands on a wire floor which permits droppings, feathers and refuse to pass through to a droppings receiver underneath, thus protecting other birds from the refuse from the hens above.

It is our object to provide a special cleaning mechanism and special forms of droppings receivers with interlocking ends for the arrangement in series which are so designed that the ends are spaced to come directly under the partitions for the purposes of cleanliness.

It is our object to provide an automatic watering system and means of conveying water from one cup to another, which means will not become clogged and foul and may be easily cleaned and are substantially self cleaning.

It is our object to provide an automatic feeding system comprising a combination of feeders and chutes with guards to separate the feeders into individual compartments, all of which are removable for easy cleaning.

It is our object to provide self feeding troughs removably attached to the fronts of the cages in order to provide a system of diversified feeding adjustable to the condition of the individual hen.

It is our object to provide an arrangement of feeders to form an egg box whereby they cover the eggs on the egg shelf and protect them from attacks by the hens and from dust and dirt.

It is an object to provide a combination front and door to each hen cage which may also be used as hanging supports for the feeders.

It is a further object of our invention to provide a structural arrangement by which vertical wires on the front of the cages permit the hens to extend their heads through the front walls formed by such wires so that the hens can eat and drink from the receptacles in the front of the cage, while the side and back walls are formed of horizontal wires placed close together to prevent one hen from reaching through the cage to fight with the hen in the next adjacent cage, pull her feathers or pick the bird next to her.

It is a further object to provide in this combination a removable wire sloping floor, which causes the eggs to roll forward to the egg shelf at the front outside of the hen cage.

These floors are so arranged that the feeders, which are removably suspended from the front of the cage, act to form a cover for the protection of the eggs which roll down the inclined floors to the egg shelf in front. The eggs are also preserved from dust and dirt and maintain their original appearance.

It is a further object to provide an automatic feeding system comprising a combination of feeders and chutes together with means of dividing these feeders into individual compartments, so that each hen is supplied with feed from a system and yet has an individual compartment from which to eat and in which she is protected from interference by any other hen. This arrangement consists of a supply feeder at the top deck into which the feed is poured and from which the feed is carried by a chute to the feeder on the next deck below and thus in turn carried to another chute and to the next feeder below.

Our invention also provides a slidable partition in the top feeder which separates the feeding compartments of the hens in the top and also acts as a shut off.

It is our object to provide a mechanical cleaning device and a litter box to catch the cleanings.

Referring to the drawings in detail:

Figure 1 is a side elevation of the apparatus;

Figure 2 is a section on the line 2—2 of Figure 1 showing the upper feed supply trough and upper end of the chute;

Figure 3 is a side elevation of a continuous droppings receiver;

Figure 4 is a side elevation of a segmental droppings receiver comprised of a plurality of sections;

Figure 5 is a modified form of receiver showing the application of a yielding steel scraper which is carried by the scraper actuating mechanism;

Figure 11 is a section on the line 11—11 of Figure 1;

Figure 12 is a top plan view of the upper feed hopper and cut off slide;

Figure 13 is a rear elevation of one of the lower feed hoppers;

Figure 14 is a top plan view of the steel scraper.

Cage arrangement

Figure 6:
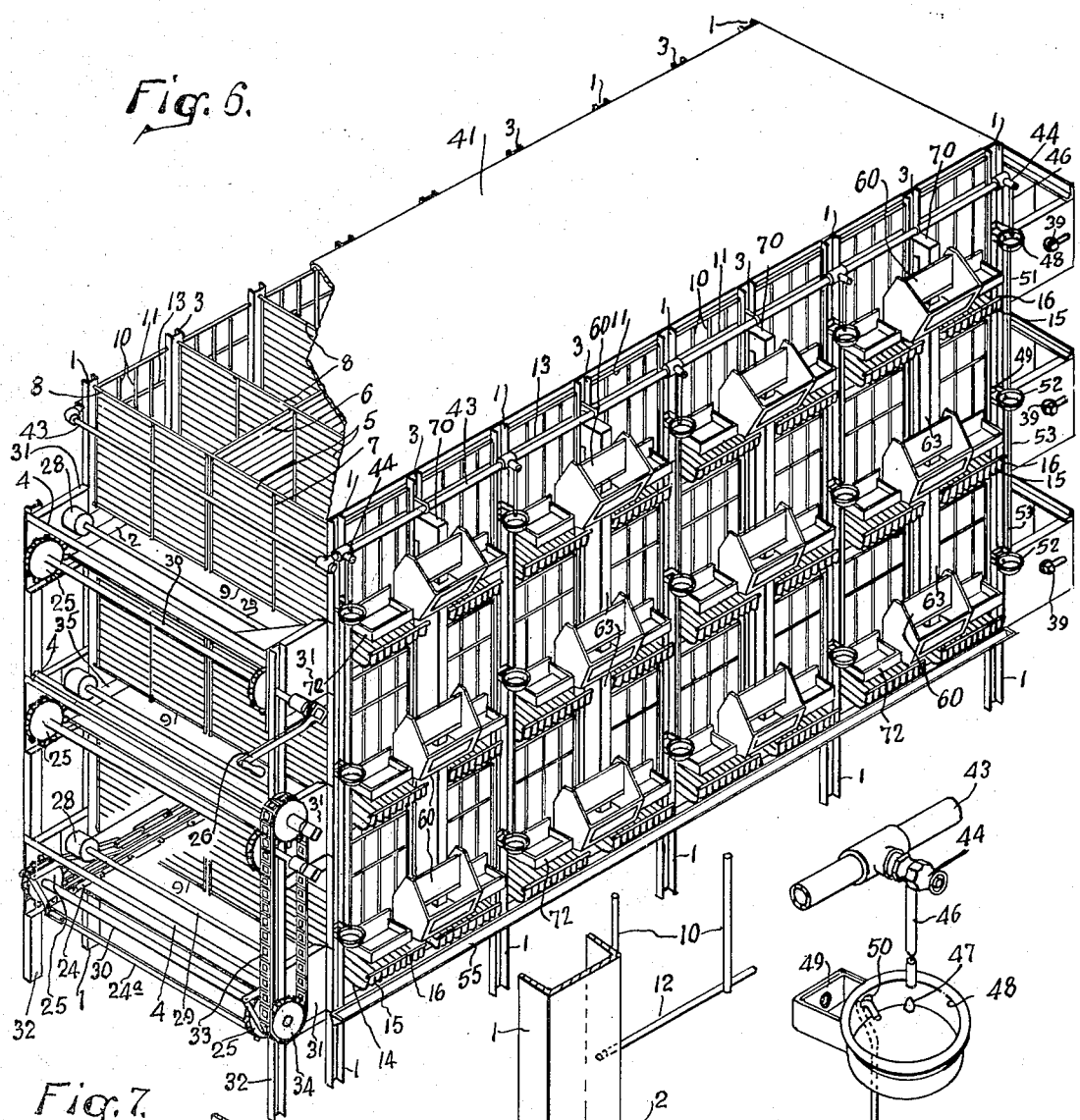
Figure 6 is an isometric perspective with the cover of the apparatus partially broken away showing the arrangement of cages and the arrangement of the side, back and front walls of the cages.
Figure 7:
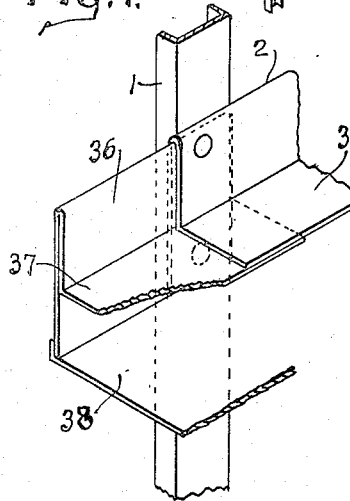
Figure 7 is a perspective of the end of the apparatus opposite one of the cranks actuating the chains showing the detail method of overlapping of the chain guide.

Referring to the drawings in detail, (Figures 1, 6 and 10) the structure comprises a plurality of upright channel members 1 interconnected horizontally by longitudinal side rails 2. Intermediate the vertical supporting members 1 which also act as legs to support the structure above the floor are shorter vertical members extending the depth of the cages and the depth of the cleaning apparatus, such members being designated 3. They are attached to the side rails 2. The upright members form supports for the feeding apparatus hereinafter described as well as supports for the watering apparatus or a part of it. These upright supports and legs 1 are interconnected by transverse angle iron members 4 which complete the frame work. It will be apparent that by using such frame work additional sections comprising additional frames may be bolted to the frames of the original structure providing an indefinite extension of the frame and, therefore, an indefinite extension of the number of cages which may be utilized for the purpose of containing the hens.

The hen cages comprise wire side and end walls 5 and 6 and closely spaced, horizontally disposed wires with an occasional vertical wire 7 for reinforcing purposes. Longitudinally extending wires 8 and 9 form the top and bottom wires respectively of the side walls. The principle to be observed in building the sides and end walls is to space the wires sufficiently close together to prevent the hen from placing its head through the wires and moving its head sufficiently to interfere with the hen in the adjacent cage.

Figure 8:
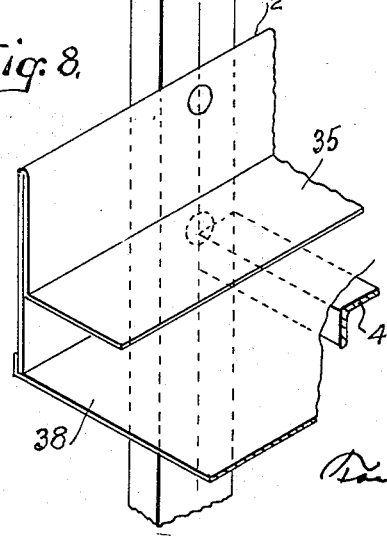
Figure 8 is an enlarged detail view of one of the channel legs showing the chain support, the spaced bottom and droppings sheet and the method of pivotally supporting the wire front for each of the cages.

The front of each cage which constitutes a door (Figures 6 and 11) is comprised of a plurality of vertical wires 10 relatively widely spaced and with practically no obstruction to the space between the wires so that the hen can freely move its head and neck through these vertical spaces for feeding and drinking purposes. There is a transverse top wire 11 and bottom wire 12 and a transverse wire 13 which acts as a pivot wire so as to permit of the swinging of the door about the axis of the wire 13. The wire 12 is adapted to snap into openings 12a (Figure 8) of the uprights 1 and 3 to hold the door in position when not being so swung. It will be noted that this wire 13 is above the position in which the hen would have its neck and head when feeding from the feeding troughs hereinafter described.

The bottom wire 12 is spaced above the removable wire bottom 14, which consists of the parallel wires 14 extending from the inside of the cage outwardly and downwardly terminating in up-turned ends 15 connected by the horizontal wire 16. These up-turned ends 15 form an egg space 17 for receiving the egg which is laid upon the wires 14. Longitudinal wires 18 with which the eggs have no contact support and reinforce this bottom.

It will be noted that the bottom is carried upon the longitudinal wire 19 and upon the side rail structure 2, (Figure 10) the details of which will be hereinafter described.

Cleaning system

By providing the open bottoms comprising the wires 14 and 18 the droppings from all the hens in any one story or tier of cages may be caught upon the receivers, such as the continuous receiver 20 or the sectional receiver 21 having the interlocking joints 22 or the overlapping sections 23.

When the interlocking sheet 21 is used, the turned over end 22a engages with the turned up end 23a of the adjacent sheet and this joint is located between the receivers in line with the posts so that the droppings will not fall upon this joint (Figure 4). Therefore, the operator can grasp these joints pulling the pans out by section and feeding them in by section at the other end.

When it is desired to provide a power cleaning mechanism, we provide the scraper bars 24a which extend across the receiver, such as 20 or 23. These scraper bars are carried at their ends on the chains 24 which are actuated by the sprockets 25 and the cranks 26. These chains pass beneath rollers 28. Both the sprockets and the rollers are carried on axles 30 and 29 respectively which are journaled in the side plates 31 carried on the upright members 1 and 32 (Figure 6). The several sprockets 25 may be interconnected by vertical chains 33 and sprockets 34 as desired.

In such an event a single crank will be sufficient for actuating two or more sets of chains.

The side rail members 2 have a flange 35 guiding the upper part of the chain. Connected therewith is a chain guide 36 at the end of the battery of cages opposite the crank. It is also provided with a chain guide surface 37. The surfaces 35 and 37 are spaced above the support 38 which may support the bottom dropping sheet or it may itself constitute the bottom dropping sheet which is supported upon the cross members 4. The exact details of this construction are not essential.

In short, there is a supplementary power frame attached to the uprights 1 comprising the uprights 32 and plates 31 which carry the guide rollers and sprockets and ends of the chains. At the other end of the mechanism are axles 39 carrying similar sprockets 25 for supporting the other ends of the chains.

Where it is desired to utilize a broad yielding scraper, we provide a steel scraper contacting one of the bars 24a which scraper is formed of a bar 240 and a plurality of teeth 40 inclined at an angle to the surface of the droppings receivers (Figure 5). 41 designates the top of the apparatus. The ends of the apparatus may be provided with detachable boxes 42 into which the droppings are scraped from the droppings receivers.

Watering system

Figure 9:
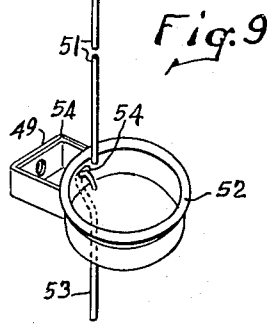
Figure 9 is an isometric perspective of a portion of the watering system comprising a supply pipe and upper cup, a drip rod and next succeeding lower cup with its drip rod.

In order to provide an adequate watering system (Figure 6) we encircle the top of the apparatus with a water pipe 43 having at intervals valves 44 controlling drip pipes 46 from which water drips as by the drops 47 into the cups 48 mounted on brackets 49 on the uprights 1 (Figure 9).

Each of these cups is provided with an aperture below its top at 50 up to which the water is to be kept in the pan 48 so that the chicken will have adequate drinking water. The overflow through the opening 50 passes down over the outside of the solid rod 51 which is suspended over the next lower cup 52 with its end in the upper edge of the cup. Water drips off this rod, fills the cup 52 and passes down over the next succeeding rod 53 through the opening 54.

The advantage of this arrangement is that the rod 51 is easily detached and cleaned, and it will not clog with feed which may flow from the cup on to the rod. When pipes have been used heretofore, they become clogged and were difficult to clean, the feed clogging them becoming sour and injurious to the chickens.

It will be noted that one of these cups is placed on each upright between each pair of cages so that the chicken can project its head and neck through the vertical spaces 10 and drink from the cup with ease.

An overflow trough 55 is provided along the bottom of the apparatus on the leg members.

Feeding system

The feeding system comprises means for supplying feed by introducing into the top of each feeding group mechanism so that only one operation is necessary of placing the feed in the upper feed trough of each group.

For this purpose (Figure 10) we provide on each upright member 3 a feed trough having a back 56 with a hook 57 which fits in a slot in the upright 3. The feed trough is provided with an intermediate partition 58 which extends between the side walls 59 about midway between the back wall 56 and the front wall 60. In the case of the uppermost trough the front wall 60 extends nearly the full depth of the side walls to form a receiving trough into which all of the feed for this trough and those below it is to be placed. The hopper is provided with a bottom 61 having an opening 62. Connected to the trough at this opening is the feed chute 63 for conveying feed to the next lower trough, which will be described hereinafter. The lowest trough has a solid bottom since no feed chute extends from this trough to a lower one.

This chute 63 is connected to the bottom 61 of the trough by the bolts 64, each of which is twisted at its lower end at 65 and projects into the chute 63 through the opening 66 (Figure 13). The other end 67 of the bolt projects through the bottom wall 61 of the trough and an overturned lip 68 of the chute 63 (Figures 2 and 12).

In order to control the amount of feed passing through the upper trough so as not to drain all of the feed from the upper trough we provide a cut-off slide comprising a three-sided box having a back 69 and sides 70. The back 69 is guided by the partition 58 and the sides are guided by the upright hook member 57 which has a channel shaped member having side flanges 57a.

Figure 10:
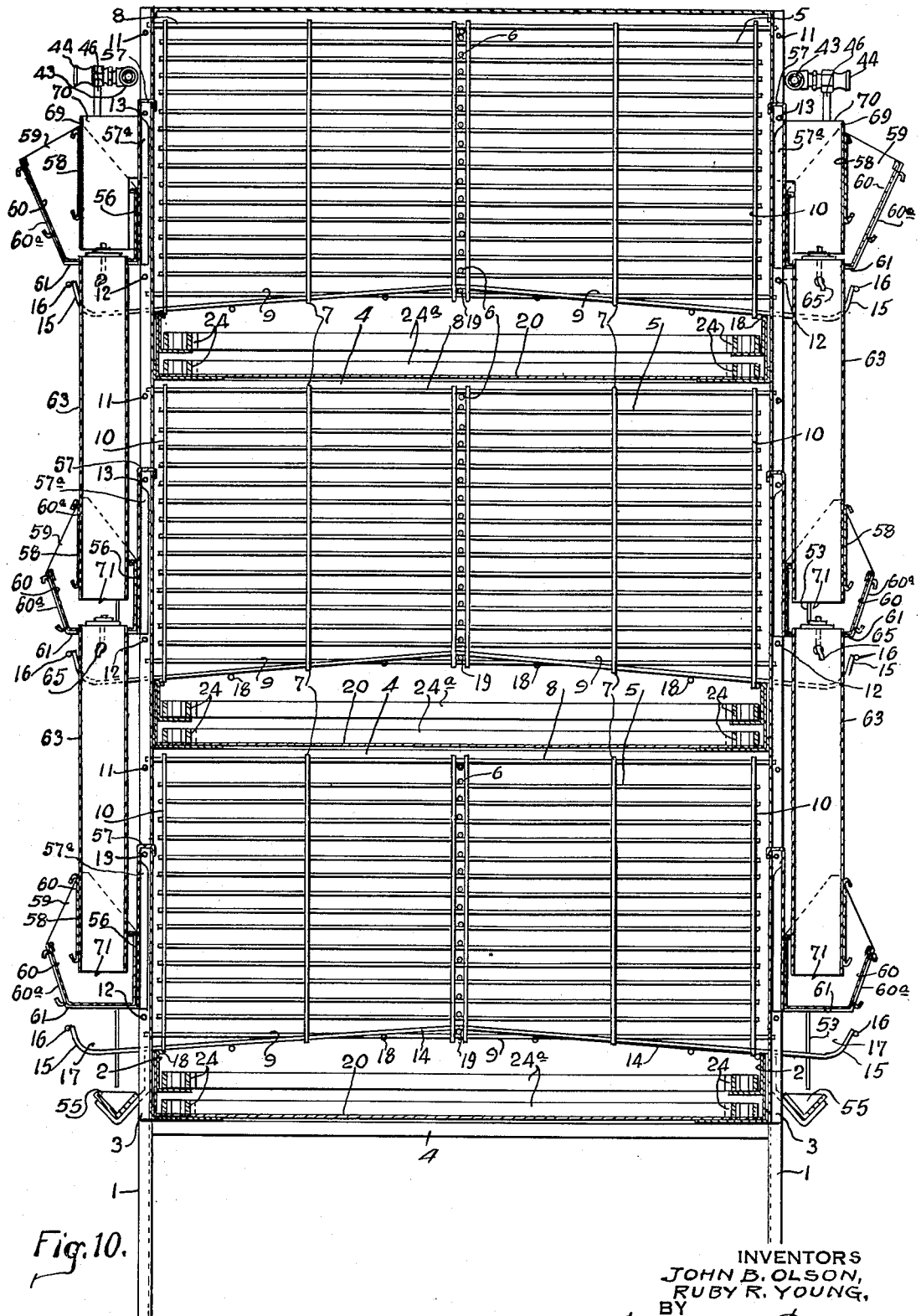
Figure 10 is a section on the line 10—10 of Figure 1.

Upon lowering this three-sided cut off the feed in the hopper at the top of the series cannot descend through the chute 63 (Figures 6 and 10).

In the lower troughs below the one just described, the front wall 60 is about half the height of the side walls 59 so that the amount of feed can be observed. The end of the discharge chute 63 is spaced a distance above the bottom 61 of the trough as at 71 a sufficient distance to regulate the amount of feed that that particular trough should have whereupon the balance of the feed will proceed down through the next chute to the next trough below.

Of course, the reason for the rear walls 56 being only half the height of the side walls is to permit the chicken to reach over this back wall 56 and eat the feed in the trough.

On the face of the troughs as at 60 are lips 60a in which record cards are placed having any desired printed matter.

72 is a detachable feed trough mounted on the wire front of each cage so that additional or specialized feed may be provided to control the diet of the hens.

It will be understood that we desire to comprehend within our invention such modifications as may be necessary to adapt it to varying conditions and uses.

Having thus fully described our invention, what we claim as new and desire to secure by Letters Patent, is:

1. A new article of manufacture for use as a trough for feed for hens comprising a bottom having a chute, side walls, front and rear walls, a chute, and a vertically disposed partition carried by the side walls between the front and rear walls and extending to a point above the bottom of the trough whereby the second chute is positioned between said partition and the back of the trough.

2. In a system of supplying feed, in combination, at least three superposed bird cages, at least three vertically spaced feed troughs, each arranged adjacent to one of said cages, the lower trough being provided with a solid bottom, and each of the upper troughs having an aperture in the bottom thereof, and a chute leading from said aperture to the next lower adjacent trough, whereby a portion of feed placed in the upper trough will be distributed through said chutes to the lower troughs, and means for detachably attaching each chute to the trough located immediately above the same, the lower end of the upper chute being directly above the aperture in the middle trough.

3. In a system of supplying water to vertically spaced hen cages, a pair of vertically spaced pans, the upper pan being provided with an overflow aperture in a side wall and spaced from its bottom, and means of communication between said pans comprising a rod communicating with the upper pan through the aperture therein and having its lower end disposed over the lower pan whereby overflow water from the upper pan will be conducted over said rod to the lower pan.

4. In a watering system, means of supplying water, a plurality of vertically spaced superimposed pans, each pan having a hole in one side, and a rod extending into one pan through the hole therein and depending therefrom into the next succeeding pan below whereby the contents of the upper pan will overflow and be directed downwardly over the outside of and along said rod into the lower pan.

JOHN B. OLSON.
RUBY R. YOUNG.